Patented Oct. 27, 1953

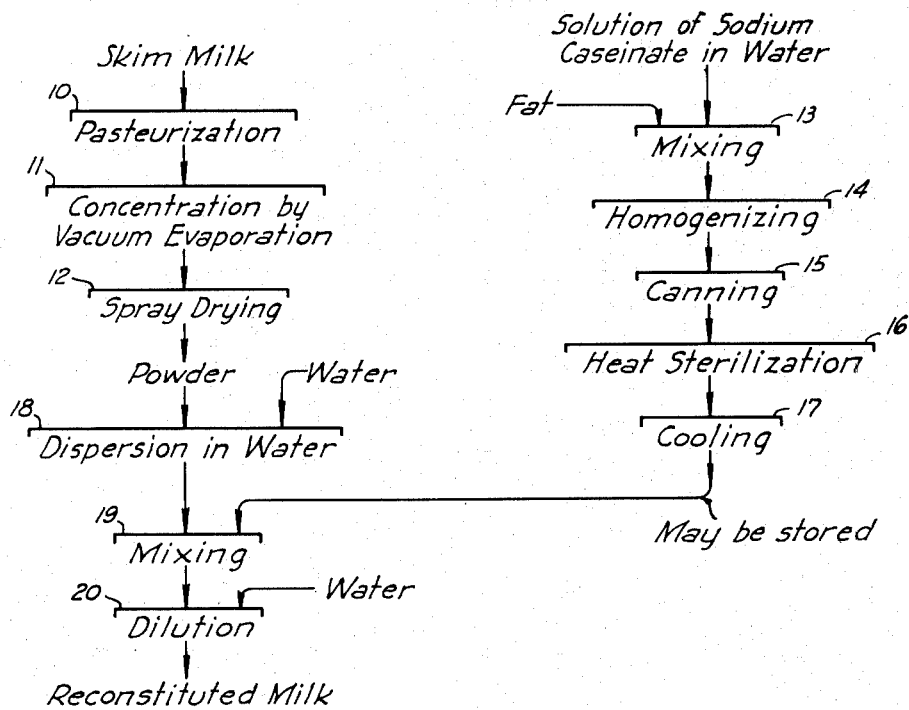

2,657,142

UNITED STATES PATENT OFFICE 2,657,142

RECONSTITUTED MILK PROCESS

David D. Peebles, Hillsborough, and Murray D. Girvin, San Anselmo, Calif., assignors to Western Condensing Company, San Francisco, Calif., a corporation of California Application October 23, 1950, Serial No. 191,692

2 Claims. (Cl. 99—63)

This invention relates generally to methods or processes for the manufacture of reconstituted liquid milk or like liquid lacteal materials.

In the past the term "reconstituted milk" has been applied to liquid material having an analysis generally similar to whole milk, but prepared from dry powdered milk solids or concentrates. For example reconstituted milk has been prepared by dispersing whole milk powder in water, with or without homogenizing. Also in some instances skim milk powder has been dispersed in water, butter or like fat added, and then the mixture homogenized to emulsify the fat. Such prior methods are subject to a number of disadvantages. Reconstituted milk prepared from whole milk powder has a distinct off flavor due to off flavors developed in the powder during processing and subsequent storage. It is generally considered that such off flavor is due to or in some way associated with oxidation of the fat content. Preparation of reconstituted milk from skim milk powder by the method outlined above requires elaborate and expensive homogenizing equipment which is not suitable for use in homes or establishments such as hotels, restaurants or the like. The keeping properties of all such reconstituted milks is relatively poor particularly in that they are subject to relatively rapid fat oxidation.

It is an object of the present invention to provide a novel method for making reconstituted milk which will avoid the disadvantages of prior methods as outlined above.

A further object of the invention is to provide a method of the above character which will result in a reconstituted milk of superior quality, having reference particularly to flavor and palatability and keeping properties.

Another object of the invention is to provide a method of the above character which is well adapted for use in homes, restaurants, hotels or like establishments.

Additional objects of the invention will appear from the following description in which the preferred embodiment has been set forth in detail in conjunction with the accompanying drawing.

The present invention involves the use of nonfat milk solids in powdered form, together with a stable water-fat emulsion. The fat emulsion is separately prepared by a procedure which avoids fat oxidation, and which prevents development of off flavor.

According to the procedure illustrated in the drawing, fresh edible skim milk is subjected to flash pasteurization at 10 as by heating the material to a temperature of 165° F. for a period of 30 seconds, followed by rapid cooling. If desired holding pasteurization can be used, as by heating to a temperature of the order of 142 to 145° F. for a period of 30 minutes, followed by rapid cooling. Flash pasteurization is preferred because it can be carried out continuously, and because it appears to have less detrimental effect upon the milk protein. Such pasteurization is sufficient to insure against bacterial contamination, but the temperature and time relationships involved do not result in any substantial denaturing or coagulation of the milk protein, or caramelization of the lactose. In other words no changes occur to the heat sensitive components of the milk solids which have the effect of impairing flavor or palatability.

Following pasteurization at 10 it is desirable to subject the skim milk to concentration by vacuum evaporation at 11 to facilitate subsequent drying. Evaporation can be carried out to the extent of producing a concentrate containing from about 35 to 55% solids. During vacuum evaporation care should be taken to avoid subjecting the material to such temperatures as would detrimentally affect the heat sensitive components. By the maintenance of proper vacuums in the various evaporating stages the treatment temperatures can be maintained well below about 150° F.

The skim milk concentrate is then spray dried at 12 to produce a high quality skim milk powder. Conventional types of spray driers can be employed for this operation.

The water-fat emulsion can be prepared as follows:—As indicated by step 13 a suitable fat is intermixed with a solution of sodium caseinate in water. The proportions can vary as follows:

45 to 89% water.
10 to 52% fat.
1.2 to 3.1% sodium caseinate.

Sodium caseinate has been found to be a highly desirable emulsifying agent for reasons presently to be explained. Preferably the casein solution is prepared by dissolving edible casein in warm water together with sodium bicarbonate, after which the solution is heated to a temperature of the order of 190 to 200° F. to evolve carbon dioxide. The proportions should be such that the pH value of the final emulsion is below about pH 8 and preferably within the range of pH 6.8 to 7.0. Although sodium bicarbonate is preferred the casein can be dissolved in a solution of sodium carbonate, and the heating step omitted.

To enhance stability and to increase the viscosity of the final emulsion we may add a material which will increase its viscosity, as for example sodium alginate or a suitable gum. Also we may add fat soluble vitamin concentrates and flavoring. Thus assuming that sodium alginate is employed, the proportioning of the ingredients can be as follows:

45 to 89% water.
0.05 to 0.2% sodium bicarbonate.
1.2 to 3.0% casein (dry).
10.0 to 52% fat.
0.0 to 0.15% sodium alginate.
Remainder fat soluble vitamin concentrates and flavoring.

The sodium caseinate produced by reaction of casein with sodium bicarbonate is from about 1.2 to 3.1% in the above general formula.

The optimum proportioning for the ingredients is as follows:

54 to 62% water.
0.05 to 0.20% sodium bicarbonate.
1.5 to 2.25% casein (dry).
35 to 45% fat.
0.03 to 0.08% sodium alginate.
Remainder fat soluble vitamin concentrates and flavoring.

The sodium caseinate produced in the last mentioned formula is from about 1.5 to 2.3%.

The mixture from 13 is subjected to homogenizing at 14, preferably at an elevated temperature of the order of from 120 to 150° F. Homogenizing is carried out to an extent sufficient to form a stable emulsion, with the bulk of the fat globules having a size of the order of 3 microns or less.

Following homogenizing the material is introduced into cans or like containers at 15, after which the containers are sealed and subjected to retorting or heat sterilization at 16. Heat sterilization can be carried out by heating the material to an elevated temperature of the order of 240° F. for a retention time of about 14 minutes. After retorting the cans are cooled and are then ready for storage or marketing.

The fat content employed should be edible and free of off flavor. It preferably has a melting point of the order of 90 to 110° F. Washed, unsalted dairy butter can be employed, or purified butter oil. In addition we may use any one of a number of edible hydrogenated vegetable oils, such as hydrogenated cottonseed oil which has a melting point within the range specified. For less expensive products suitable for animal feeding we can use animal fats such as lard or tallow. A desired flavoring ingredient can be introduced into the emulsion as indicated in the foregoing formulas. Thus small amounts of known flavoring ingredients can be introduced to impart for example a natural butter-like flavor. As a suitable flavoring known butter flavoring products can be employed, such as a product containing butyrate or like esters, caprylic acid, bitter almond and like essential oils, and traces of aldehydes and ketones. Also we have used cultured butter flavors.

When butter or butter oil is employed it is desirable to add a small amount of a suitable antioxidant, such as 0.015% of Tocopherol or 0.005% of butylated hydroxyanisole, or mixtures of the same. This serves to prevent off flavor during high temperature sterilization.

To proceed with making a reconstituted milk from the dry skim milk powder and the water-fat emulsion, a measured amount of the dry skim milk powder is dispersed in water as indicated at 18, and this dispersion is then mixed with a measured amount of the water-fat emulsion at 19. No elaborate procedure need be employed for these mixing operations. Thus to disperse the skim milk powder, it can be introduced into a common glass jar together with a measured amount of water, and the powder dispersed by shaking. Thereafter a measured amount of the emulsion can be added, and the emulsion homogeneously mixed with the dispersion by further shaking. After mixing at 19 the material may be further diluted by addition of water at 20, to produce a milk having the desired percentage of solids.

By way of example in one instance the method was carried out as follows: Sweet edible skim milk was selected having a pH value of about 6.6, and containing about 1.0% residual fat content. This skim milk was subjected to flash pasteurization by heating to 165° F. for a period of 30 seconds, followed by rapid cooling. It was then concentrated by vacuum evaporation to 45% solids, and spray dried to form a powder. To form the fat emulsion, 1,280 grams of edible casein (in dry granular form) was dissolved in 32,300 grams of water at about 160° F., together with 62 grams of sodium bicarbonate. The solution thus formed was heated to a temperature of 190° F. for a period of 60 minutes, and then cooled to 160° F. There was then added 40 grams of sodium alginate, 22,700 grams of melted hydrogenated cottonseed oil (at 120 to 140° F.), 2.1 grams of commercial butter flavoring and fat soluble vitamin concentrates as follows:

12,000 International units carotin per pound of fat.
3,000 International units vitamin A as vitamin A alcohol, per pound of fat.
5,000 International units vitamin D concentrate in irradiated ergosterol per pound of fat.

All of the above ingredients were intermixed and then whipped by agitation to homogeneously intermix the ingredients. The material was then homogenized at a temperature of 140° F. by passing the same twice through a two valve Manton-Gaulin homogenizer. The pressure drop across each of the two valves was 2000 p. s. i. for the first pass, and for the second pass 1500 p. s. i. The material produced by such homogenization was a relatively viscous and homogeneous emulsion, although liquid in form. It was placed in cans, the cans sealed, and then heat sterilized at 240° F. During sterilization the cans were gradually heated to 240° F. over a period of 15 minutes, held at 240° F. for 14 minutes and then cooled to near room temperature in a period of about 6 minutes. The pH value of the emulsion immediately before and after heat sterilization was about pH 7.0. The final emulsion analyzed as follows:

57.776% water.
2.25% sodium caseinate.
40% hydrogenated fat.
0.07% sodium alginate.
0.004% vitamin concentrates and flavoring.

To produce one quart of reconstituted milk, 9⅓ level tablespoons of the skim milk powder was introduced into a quart glass jar together with one pint of warm water. The jar was then shaken vigorously about 30 times, and then 7 level tablespoons full of the water-fat emulsion was added. The jar was again shaken after which cold water was added to fill the jar, allowing time for the foam to settle. The result was a highly palatable reconstituted milk comparable to ordinary fresh whole dairy milk, except that the fat content appeared to be more inseparably dispersed. In this respect the product was similar to homogenized fresh whole milk.

The excellent flavor of our reconstituted milk is attributed to features of the above described method. Since the fat and nonfat milk solids are separately processed, they are not subjected to elevated temperatures while in intimate contact. Apparently chemical and physical changes take place when nonfat milk solids are heated together with fat, which we do not clearly understand, but which impart noticeable off flavor characteristics. With our product these undesirable flavor characteristics are completely absent, because there is no opportunity for their development in either the skim milk powder or the water-fat emulsion.

Because of the ease with which the reconstituted milk can be prepared by use of the skim milk powder and the water-fat emulsion, we prefer to market these two ingredients in companion sealed containers, having such capacity that when the powder is dispersed in a given amount of water, and the water-fat emulsion added, a whole milk of the standardized analysis is obtained.

While particular reference has been made to the use of skim milk as a source of nonfat milk solids, it is possible to use other substantially fat-free lacteal materials. For example the skim milk can be partially delactosed before being used according to the present method, and in such event the powder has a reduced lactose content. Also in place of using ordinary fresh skim milk we can employ a skim milk which is demineralized by contact with ion exchange resins, as disclosed in Patent 2,465,906. In some instances it may be desirable to add lactose or other sugars to the skim milk, in order to increase the lactose content of the final product or to sweeten the flavor. Special materials such as gums and resin can be added to the nonfat milk solids to produce a material suitable for special purposes, as for example for the manufacture of frozen confections.

Reference is made to our copending application Serial No. 183,188, filed September 5, 1950, and entitled "Fat Emulsion and Method of Manufacture."

We claim:

1. A method for making a reconstituted liquid milk comprising subjecting skim milk to pasteurization and vacuum evaporation, spray drying the resulting concentrate to form a dry powdered material, mixing the dried powdered material with water to form a dispersion, forming a water-fat emulsion, said emulsion comprising essentially 45 to 89% water, 10 to 52% fat, and 1.2 to 3.1% sodium caseinate, homogenizing the mixture to form a stable emulsion, subjecting the emulsion to heat sterilization at a temperature of the order of 240° F., and then mixing the emulsion with the dispersion to thereby form a reconstituted fat-containing milk.

2. A method as in claim 1 in which the emulsion comprises essentially from 54 to 62% water, 35 to 45% fat, and 1.5 to 2.3% sodium caseinate.

DAVID D. PEEBLES.
MURRAY D. GIRVIN.

References Cited in the file of this patent

UNITED STATES PATENTS

| Number | Name | Date |
|---|---|---|
| 746,502 | Hall | Dec. 8, 1903 |
| 1,190,369 | Beckman et al. | July 11, 1916 |
| 1,302,486 | Dunham | Apr. 29, 1919 |
| 1,403,405 | Habbema | Jan. 10, 1922 |
| 2,392,401 | North et al. | Jan. 8, 1946 |